United States Patent Office 3,086,038
Patented Apr. 16, 1963

3,086,038
ORGANOALUMINUM COMPOUNDS
Merle L. Gould, Baton Rouge, La., assignor to Ethyl Corporation, New York, N.Y., a corporation of Virginia
No Drawing. Filed Mar. 29, 1960, Ser. No. 18,251
12 Claims. (Cl. 260—448)

This invention relates to the manufacture of organoaluminum compounds. More particularly, the invention relates to the manufacture of a new and novel complex material, and also a new and improved process for the manufacture of alkyl aluminum sesquichloride compounds and other aluminum alkyl materials.

Organoaluminum compounds have, in recent years, grown in commercial importance. Thus, organoaluminum compounds have been employed extensively as components of catalysts for the generation of polyolefin resinous material, or as alkylation catalysts.

Outstanding among the organoaluminum compounds of this nature has been ethyl aluminum sesquichloride $(C_2H_5)_3Al_2Cl_3$. This versatile material is useful in its own right, as a component of catalysts, for example, and also as a highly effective intermediate for the production of other materials. Ethyl aluminum sesquichloride can be reacted readily with aluminum chloride to provide ethyl aluminum dichloride, $(C_2H_5)AlCl_2$. Alternatively it can be reacted with triethyl aluminum to provide diethyl aluminum chloride, $(C_2H_5)_2AlCl$. Ethyl aluminum sesquichloride can also be readily reduced with an alkali metal to provide a high purity triethyl aluminum. In the preparation of ethyl aluminum sesquichloride, heretofore, metallic aluminum has been directly reacted with ethyl chloride at elevated temperatures to form the ethyl aluminum sesquichloride.

While the foregoing reaction of ethyl chloride and aluminum is quite effective, it suffers from the disadvantages that relatively expensive ethyl chloride is required as a reagent. This disadvantage is more pronounced when production of higher alkyl compounds is desired. In such instances, the alkyl chlorides are, apparently, for all practical purposes, inoperable, and the quite expensive alkyl bromides or alkyl iodides appear to be essential. In other words, materials such as n-propyl aluminum sesquichloride, isobutyl aluminum sesquichloride, and higher alkyl aluminum sesquichlorides have not been prepared, although products such as di-n-propyl aluminum iodide have been reported. It is thus apparent that a more efficient procedure for the manufacture of the alkyl aluminum sesquichlorides is desirable, not only to provide utilization of lower price raw materials, but also to make it possible to effectively manufacture such compounds having more than two carbon atoms in the alkyl group. Ruthruff, in U.S. Patent 2,271,956, describes a process wherein an olefin, hydrogen, and an aluminum halide is reacted with metallic aluminum ostensibly to produce alkyl aluminum halides. However, no illustration shows a good production of the alleged compounds, and in fact, it appears that significant polymerization of the olefin involved would occur. Significant need has thus existed for a more direct and effective process for producing alkyl aluminum sesquichloride compounds, without being restricted to two carbon atom alkyl radicals, and without necessitating the employment of expensive alkyl halides.

A general object of the present invention is to provide a new and more direct process for the manufacture of alkyl aluminum chloride materials. More particularly, an object of the present invention is to provide a process which is capable of producing alkyl aluminum chloride materials of the sesquichloride type, and particularly wherein the alkyl groups contain two to about six carbon atoms. An additional object of the invention is to provide a new class of novel complex compounds suitable for conversion to the desired alkyl aluminum chloride products. An additional object of certain embodiments is to provide a process for making alkyl aluminum sesquichloride compounds wherein the alkyl groups can include at least two different alkyl radicals, and further, wherein the identity of alkyl groups can be rigorously controlled or directed. Still another object of certain embodiments of the invention is to provide a novel process wherein a mixture of a trialkyl aluminum with a dialkyl aluminum hydride, is converted to high purity trialkyl aluminum.

In all forms of the process, a new composition is first produced, having the formula $R_2Al_2Cl_3H$ wherein R is a lower alkyl radical, that is, having from one to, usually, about six carbon atoms, although higher alkyl groups are permissive. Such compositions are produced by reacting together approximately equimolal proportions of a dialkyl aluminum hydride and aluminum chloride. The products are homogeneous, clear liquids, except when the alkyl groups all have five or more carbon atoms, in which cases, the compounds have melting points ranging from ambient temperatures to moderately elevated temperatures.

These new materials can then be further reacted, by treating with an olefin, particularly a 1-alkene, thus producing an alkyl aluminum sesquichloride, $R_3Al_2Cl_3$. The alkyl group thus established may be the same as or different than the two alkyl groups in the new composition.

The best mode of operations of the several embodiments of the present invention will be clearly understood from the detailed examples below and the detailed description hereinafter, wherein all parts and concentrations are by weight, unless otherwise noted.

*Example 1*

A relatively pure fraction of diethyl aluminum hydride, $(C_2H_5)_2AlH$, is reacted with finely subdivided anhydrous aluminum chloride, in the proportions of 150 parts of aluminum chloride to 100 parts of the diethyl aluminum hydride, or approximately in a 1:1 mole ratio. The two materials were vigorously mixed and combination occurred with the evolution of a small amount of heat, a clear, viscous liquid being produced. Analysis of a portion of this liquid shows the composition corresponding to diethyl dialuminum trichlorohydride $(C_2H_5)_2Al_2Cl_3H$.

The product of the foregoing operation, diethyl dialuminum trichlorohydride, is a clear, mobile liquid. Upon standing, however, gelling sometimes occurs.

Aliquot portions of this product were then taken and reacted with alpha olefin gases as follows:

Ethylene—a pressure of, initially, about 150 pounds per square inch of ethylene was applied and was rapidly absorbed in proportions corresponding to 1 mole per mole of the diethyl dialuminum trichlorohydride forming ethyl aluminum sesquichloride therefrom in good yield. The process is carried out at a temperature of about 125° C.

Propylene—in this operation a similar technique is employed, and a good conversion to diethyl propyl dialuminum trichloride is provided.

Other olefins—when n-butene, isobutylene, hexene, or other lower alpha olefins are reacted with the diethyl dialuminum trichlorohydride, as above, comparable reaction is encountered and an alkyl aluminum sesquichloride is produced, wherein one of the three alkyl groups, is of course, corresponding to the olefin reacted. In the case of reacting alpha olefins of normally liquid character, the proportionate quantity is mixed with the diethyl dialuminum trichlorohydride, the reaction vessel closed and heat is applied to initiate reaction.

Example II

In this operation a supply of dimethyl aluminum hydride, 100 parts, is mixed with 235 parts of aluminum chloride, and a smooth, heat evolving, reaction occurs, similar to the reaction in Example I, resulting in formation of dimethyl dialuminum trichlorohydride. Treatment of aliquot portions of this compound with ethylene, propylene, n-butene, and other alpha olefins as in Example I above, results in comparable generation of dimethyl alkyl dialuminum trichloride materials.

Example III

In this embodiment 96 parts of anhydrous aluminum chloride is reacted with 100 parts of diisobutyl aluminum hydride, again resulting in relatively rapid production of diisobutyl dialuminum trichlorohydride, which is suceptible to prompt and efficient reaction with ethylene, n-butene, n-pentene-1, n-hexene-1, propylene and other lower alpha olefins to make the corresponding trialkyl dialuminum trichloro compounds, or alkyl aluminum sesquichlorides wherein one of the alkyl groups corresponds to the olefin mentioned.

As previously indicated, one of the most significant benefits of the present invention is its application to a mixture of a dialkyl aluminum hydride with a corresponding trialkyl aluminum compound. Such mixtures are the product of certain synthesis processes, involving the direct combination of aluminum metal, hydrogen, and an olefin, usually carried out in the presence of a reaction medium which includes at least some corresponding alkyl aluminum compound as a component.

Example IV

In this operation, finely subdivided aluminum metal is provided in a reaction zone suspended in a liquid system comprising approximately equimolar proportions of triethyl aluminum and diethyl aluminum hydride. Ethylene and hydrogen pressure are applied to the system jointly, while vigorously stirring and maintaining the liquid phase at a temperature of about 140° C. Concurrent reaction of these components results in the formation of additional quantities of triethyl aluminum and diethyl aluminum hydride, in approximately equimolar proportions, resulting in additional production of a liquid phase, wherein the triethyl aluminum concentration is of the order of 60 percent and the diethyl aluminum hydride in the proportions of about 40 percent.

The liquid phase is withdrawn, and separated from any unreacted solid aluminum present by filtration or sedimentation and decanting. The components are separated into relatively pure diethyl aluminum hydride and triethyl aluminum by fractionation at a pressure of below 10 mm. mercury, and at a temperature of from 60 to 100° C.

The diethyl aluminum hydride fraction is then reacted with aluminum chloride in equimolar proportions, resulting in a virtually stoichiometric yield of diethyl dialuminum trichlorohydride, which is then reacted with ethylene as in Example I, forming ethyl aluminum sesquichloride, $(C_2H_5)_3 Al_2Cl_3$. This product is then treated with finely subdivided alkali metal, resulting in the reduction thereof to a pure grade of triethyl aluminum, which is combined or mixed with the triethyl aluminum fraction from the original operation, if desired, providing a good overall yield of pure triethyl aluminum.

In contrast, when the equimolar mixture of triethyl aluminum and diethyl aluminum hydride, for the first step of the operation, is treated, as is, with ethylene pressure, it is found that a substantial quantity of higher alkyl substituents are produced in the product. On the other hand, when ethylene is reacted with the separated diethyl dialuminum trichlorohydride, virtually no chain growth occurs. Accordingly, the present process affords a highly efficient route to producing a very pure grade of triethyl aluminum without the necessity of utilizing ethyl chloride as a starting material.

Example V

In this operation, the reactants are di-n-pentyl aluminum hydride and aluminum chloride. Upon reacting this material with anhydrous aluminum chloride in equimolal proportions, a good yield of di-n-pentyl dialuminum trichlorohydride is obtained. This product reacts readily with olefinic hydrocarbons, as is the case with the other dialkyl dialuminum trichlorohydride compounds available by this process.

The step of forming the new compounds of the present invention, viz., the dialkyl dialuminum trichlorohydride compounds, is relatively simple. In virtually all instances the dialkyl aluminum hydride and aluminum chloride are fed together in approximately equimolecular proportions. The aluminum chloride should be an anhydrous material, preferably finely divided. In continuous operations a slight excess or deficiency of any individual component present in the reaction zone at one time is not particularly deleterious to the operation, the overall consumption being almost identically on an equimolal basis. Normally, unless production rates are quite high, it is most convenient to carry out the preparation in a batch manner, viz., by feeding together batch quantities of aluminum chloride and the dialkyl aluminum hydride, and vigorously agitating while heating at moderate temperatures. It will be readily apparent that, if desired, a plurality of dialkyl aluminum hydride feed components can be provided, whereby a corresponding plurality of dialkyl dialuminum trichlorohydride components are obtained.

The reaction is carried out at temperatures from about ambient conditions to about 130° C., in the ordinary operation, but the temperatures are not thus limited. It is ordinarily preferred not to exceed a temperature of about 100° C., and in some instances pressure operation will be necessary to accomplish the desired reaction. Vigorous agitation is highly desirable, as the aluminum chloride component is normally fed as a subdivided solid. In addition, adequate cooling is necessarily provided, as the reactions are exothermic in character.

In those operations wherein the formation of the dialkyl dialuminum trichlorohydride is followed by its reaction with an olefin hydrocarbon, the particular operating conditions will vary with the identity of the components or reactants involved. In the case of the lower olefins, which are normally gaseous, pressure operation is desired. Pressures of about 50 to 500 pounds per square inch are usually employed, at temperatures of 50 up to about 140 or 150° C. The temperature is not as critical in the present process, employing ethylene, as in other processes in which ethylene is added to a dialkyl aluminum hydride. In the latter case, ethylene is well known to exhibit a tendency to form higher alkyl groups and this tendency is affected by the temperature of operation. In the present process, ethylene exhibits virtually no tendency to "chain grow" or form longer alkyl groups.

In addition to the peculiar utility of the new compounds of the invention, with respect to the efficient and economical formation of an alkyl aluminum sesquichloride, these materials are highly suitable as economical and convenient sources of organoaluminum materials for purposes such as components of polymerization catalysts, reducing agents, and for organic syntheses generally. As already noted, a particular and highly advantageous utility is their use as intermediates in an overall process for producing a highly selective and purified grade of a trialkyl aluminum by a sequence of operations as in Example IV. In addition to the formation of, for example, a very pure grade of triethyl aluminum, the reaction of the dialkyl dialuminum trichlorohydrides with olefin having an odd number of carbon groups provides a highly effective route to the formation of straight chain substituents having an odd number of carbon atoms.

In addition to the technique illustrated by Example IV wherein the trialkyl aluminum and dialkyl aluminum hydride of a first synthesis operation are separated, for separate formation, from the latter, of a dialkyl dialuminum trichlorohydride, this operation can be conducted without such a separatory step. In such instances, sufficient aluminum chloride is mixed with the first step product mixture to correspond to the dialkyl aluminum hydride, whereby a mixture including the trialkyl aluminum and dialkyl dialuminum trichlorohydride is produced. Some of the aluminum chloride will also complex with the trialkyl aluminum. Reaction of this mixture with a desired olefin results in a selective, or partly selective reaction thereof with the dialkyl dialuminum trichlorohydride component, resulting in a mixture including the trialkyl aluminum with alkyl aluminum chlorides, the composition of which is determined by the starting material compositions. In the case of ethylene, as the added olefin, there is some tendency for reaction to also occur with the trialkyl aluminum component, forming longer alkyl substituent groups. When the added olefin is, however, a higher olefin, this tendency is much less apparent.

With respect to the olefins suitable for reacting with the dialkyl dialuminum trichlorohydride compounds, the simple lower alkene compounds are most common, such as ethylene, propylene, butene-1, pentene-1, hexene-1 and the like. However, alpha branched chain olefins, or internal olefins, both straight and branched, are also fully operable when the corresponding alkyl groups are desired. Thus butene-2, isobutylene, pentene-2, 2-methyl butene-1, 2-methyl butene-2, 2-methyl pentene-1, 2-ethyl hexene-1, and other olefin hydrocarbons can be effectively employed as reactants.

Having fully described the invention and the best mode of working the several embodiments thereof, what is claimed is:

1. The process of making a composition having the empirical formula $R_2Al_2Cl_3H$, wherein R is an alkyl hydrocarbon radical having from 1 to 5 carbon atoms, comprising reacting together, at a temperature of not over about 130° C., a dialkyl aluminum hydride, wherein the alkyl radicals correspond to said R, and aluminum chloride, in approximately equimolal proportions.

2. The process of claim 1 further defined in that the dialkyl aluminum hydride is diethyl aluminum hydride.

3. The process of claim 1 further defined in that the dialkyl aluminum hydride is dimethyl aluminum hydride.

4. The process of claim 1 further defined in that the dialkyl aluminum hydride is di-isobutyl aluminum hydride.

5. The process of claim 1 further defined in that the dialkyl aluminum hydride is di-n-pentyl aluminum hydride.

6. The process of making an alkyl aluminum sesquichloride having alkyl groups of from one to five carbon atoms, comprising reacting together, in approximately equimolal proportions, and at a temperature of not over about 130° C., aluminum chloride and a dialkyl aluminum hydride having alkyl groups of from one to five carbons atoms, and forming thereby a homogeneous liquid composition having the empirical formula $$R_2Al_2Cl_3H$$

wherein R represents the alkyl groups of the dialkyl aluminum hydride, and then reacting said composition with an olefin having up to five carbon atoms, and forming the alkyl aluminum sesquichloride.

7. The process of claim 6 further defined in that the dialkyl aluminum hydride is diethyl aluminum hydride and the olefin is ethylene.

8. A process for making triethyl aluminum substantially free of hydrocarbon radicals of more than 2 carbon atoms, comprising forming a mixture of diethyl aluminum hydride and triethyl aluminum by the direct reaction of aluminum, hydrogen and ethylene, then separating the diethyl aluminum hydride of said mixture and reacting with aluminum chloride in approximately equimolecular proportions thereto, forming thereby a corresponding quantity of a composition having the empirical formula of $(C_2H_5)_2Al_2Cl_3H$, and then reacting said composition with ethylene and producing thereby ethyl aluminum sesquichloride, and then reducing said ethyl aluminum sesquichloride to triethyl aluminum with an alkaline reducing metal.

9. As a new composition, a homogeneous liquid material having the empirical composition $R_2Al_2Cl_3H$, wherein R is an alkyl radical of 1 to 5 carbon atoms.

10. As a new composition, the homogeneous liquid having the empirical formula $(C_2H_5)_2Al_2Cl_3H$.

11. As a new composition, the homogeneous liquid having the empirical formula $(CH_3)_2Al_2Cl_3H$.

12. As a new composition, the homogeneous liquid having the empirical formula $(i\text{-}C_4H_9)_2Al_2Cl_3H$.

References Cited in the file of this patent

UNITED STATES PATENTS

| | | |
|---|---|---|
| 2,786,860 | Ziegler et al. | Mar. 26, 1957 |
| 2,826,598 | Ziegler et al. | Mar. 11, 1958 |
| 2,835,689 | Ziegler et al. | May 20, 1958 |

OTHER REFERENCES

Grosse et al.: J. Organic Chemistry, vol. 5 (1940), pp. 109–111.

Coates: "Organo-Metallic Compounds" (1956), p. 81.